H. ODELL.
Motor.

No. 160,460. Patented March 2, 1875.

Witnesses
Chas H Smith
Harold Serrell

Inventor
Henry Odell
per L. W. Serrell
atty.

UNITED STATES PATENT OFFICE.

HENRY ODELL, OF PEEKSKILL, NEW YORK.

IMPROVEMENT IN MOTORS.

Specification forming part of Letters Patent No. 160,460, dated March 2, 1875; application filed August 22, 1874.

*To all whom it may concern:*

Be it known that I, HENRY ODELL, of Peekskill, in the county of Westchester and State of New York, have invented an Improvement in Motors for Churns, &c., of which the following is a specification:

In converting a slow rotary motion into a rapid reciprocating motion there is generally considerable loss from friction.

My invention is made for converting the rotary motion from a spring-barrel into a rapid revolving motion with very little friction, and obtaining from one spring more or less powerful motion, the less powerful movement continuing for a longer period than the more powerful.

Figure 2:
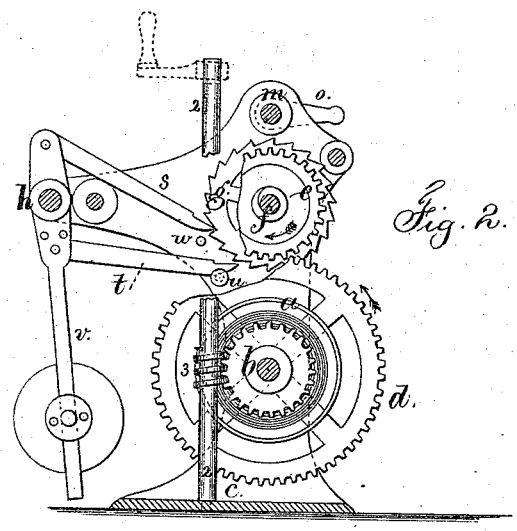
Figure 1:
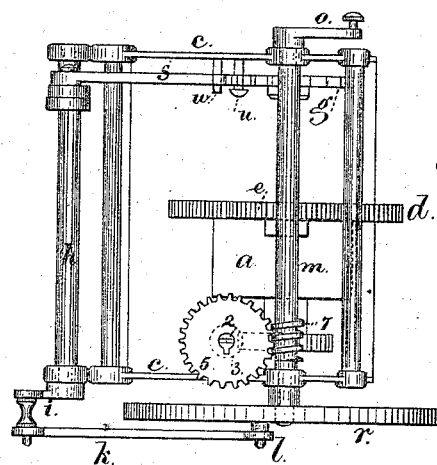

In the drawing, Figure 1 is a plan of the machine, and Fig. 2 is an elevation with portions of the frame and gearing removed to show the pawl movement.

The spring-barrel $a$ is upon the shaft $b$, and this is sustained by the frames $c\,c$. The gear-wheel $d$ of the spring-barrel $a$ revolves the pinion $e$, shaft $f$, and ratchet-wheel $g$. There may be two or more spring-barrels, if desired. The rock-shaft $h$ is provided with an arm, $i$, and pitman $k$ to the crank $l$ upon the shaft $m$, so as to revolve the said shaft $m$ by the movement of the rock-shaft, and from this shaft $m$ motion is taken by the crank $o$ for a churn or other article to be operated, and a fly-wheel, $r$, is preferably employed to equalize the movement. The pawls $s$ and $t$ are hinged to crank-arms at opposite sides of the rock-shaft $h$, and the ends of the pawls are contiguous to the teeth of the ratchet-wheel $g$, and the lower pawl $t$ rests upon the supporting-pin $u$, when not in operation. A pendulum-arm, $v$, and weight are fastened below the rock-shaft $h$, and swing with it, so as to serve as an equalizer of the movement.

It will now be evident that the spring, turning the wheel $d$ in the direction indicated, gives end motion to the pawl $s$, and swings the rock-shaft, and this movement carries the end of the pawl $t$ toward the next ratchet-tooth. As the crank $l$ turns its center the momentum of the fly-wheel presses the end of $t$ sufficiently against the tooth of the ratchet-wheel to relieve the pawl $s$, and this pawl $s$ drops, and the power acts upon the pawl $t$ to move the rock-shaft the other way, and in so doing the pawl $s$ slides back on the pin $w$, and takes the next tooth, and when the pressure is transferred from $t$ to $s$ the pawl $t$ drops, and then slides back upon the pin $u$ until it comes in contact with another tooth.

The shaft 2 and worm-pinion 3 serve to wind the spring, said pinion 3 acting upon the worm-wheel of the shaft $b$, and this pinion 3 and shaft are revolved by a crank-handle applied to the end thereof, as indicated by dotted lines; but if the power of the spring is greater than that which is required for use, the spring may be made to run longer by slipping the pinion 5 upon a feather on the shaft 2, so that it gears into the worm-pinion 7 upon the shaft $m$, and thereby a portion of the power is expended in winding up the spring, and making the motor run longer, but exert less power.

I claim as my invention—

In combination with the pawls $s\,t$, rock-shaft $h$, and revolving shaft $m$, the movable pinion 5 and worms 3 7, for transmitting motion from the shaft $m$ to the spring-barrel shaft $b$, and partially wind the same, substantially as set forth.

Signed by me this 18th day of August, A. D. 1874.

HENRY ODELL.

Witnesses:
GEO. D. WALKER,
CHAS. H. SMITH.